(12) United States Patent
Kohda

(10) Patent No.: US 6,566,675 B2
(45) Date of Patent: May 20, 2003

(54) METHOD OF AND APPARATUS FOR OBTAINING RADIATION IMAGE

(75) Inventor: Katsuhiro Kohda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 202 days.

(21) Appl. No.: 09/770,220

(22) Filed: Jan. 29, 2001

(65) Prior Publication Data

US 2002/0005499 A1 Jan. 17, 2002

(30) Foreign Application Priority Data

Jan. 27, 2000 (JP) .................................... 2000-018615

(51) Int. Cl.⁷ .............................................. G11B 7/135
(52) U.S. Cl. ...................................... 250/586; 250/584
(58) Field of Search .................................. 250/584, 585, 250/586, 587, 330, 332, 334, 337.2

(56) References Cited

U.S. PATENT DOCUMENTS

| | | | | |
|---|---|---|---|---|
| 4,484,073 A | * | 11/1984 | Ohara et al. ............... | 250/337 |
| 4,752,557 A | | 6/1988 | Tsuchino et al. ........... | 430/496 |
| 4,899,049 A | * | 2/1990 | Hishinuma ................. | 250/586 |
| 4,977,322 A | * | 12/1990 | Agano et al. .............. | 250/584 |
| 5,006,708 A | * | 4/1991 | Itoh et al. .................. | 250/587 |
| 5,028,784 A | * | 7/1991 | Arakawa et al. ........... | 250/327.2 |
| 5,151,597 A | * | 9/1992 | Agano ........................ | 250/587 |
| 5,208,459 A | * | 5/1993 | Morrone et al. ........... | 250/484.4 |
| 5,444,266 A | * | 8/1995 | Takeda et al. ............. | 250/484.4 |
| 5,677,542 A | * | 10/1997 | Ogura et al. ............... | 250/585 |
| 5,801,391 A | * | 9/1998 | Arakawa et al. ........... | 250/581 |
| 5,881,162 A | * | 3/1999 | Ishimitsu ................... | 250/370.09 |
| 5,981,968 A | * | 11/1999 | Nakazawa .................. | 250/587 |
| 6,229,877 B1 | * | 5/2001 | Agano ........................ | 250/580 |
| 6,268,614 B1 | * | 7/2001 | Imai .......................... | 250/591 |
| 6,417,518 B2 | * | 7/2002 | Arakawa et al. ........... | 250/587 |
| 2002/0024027 A1 | * | 8/2001 | Yamada ...................... | 250/584 |

FOREIGN PATENT DOCUMENTS

| | | | | |
|---|---|---|---|---|
| JP | 60-135800 | | 7/1985 | ............ G21K/4/00 |
| JP | 62-36599 | | 2/1987 | ............ G12K/4/00 |
| JP | 62-36600 | | 2/1987 | ............ G21K/4/00 |
| JP | 401262454 A | * | 4/1988 | |

* cited by examiner

Primary Examiner—David Porta
Assistant Examiner—Christine Sung
(74) Attorney, Agent, or Firm—Sughrue Mion, PLLC

(57) ABSTRACT

A radiation image conversion panel has a stimulable phosphor layer which is parted into a plurality of cells regularly arranged at least in a main scanning direction by a partition wall and has been exposed to a radiation bearing a radiation image of an object. The radiation image conversion panel is scanned by a stimulating light beam in the main scanning direction and a sub-scanning direction and stimulated emission emitted from the radiation image conversion panel upon stimulation by the stimulating light beam is photoelectrically detected to make up an analog image signal and a digital image signal representing a radiation image of the object is obtained by digitizing the analog image signal. The sampling intervals Ts (in seconds) for digitizing the analog image signal are set to satisfy formula $$Ts \leq Na/2v,$$

wherein Na represents the pitch (m) of the cells in the main scanning direction and v represents the scanning speed (m/sec)

19 Claims, 6 Drawing Sheets

F I G . 2
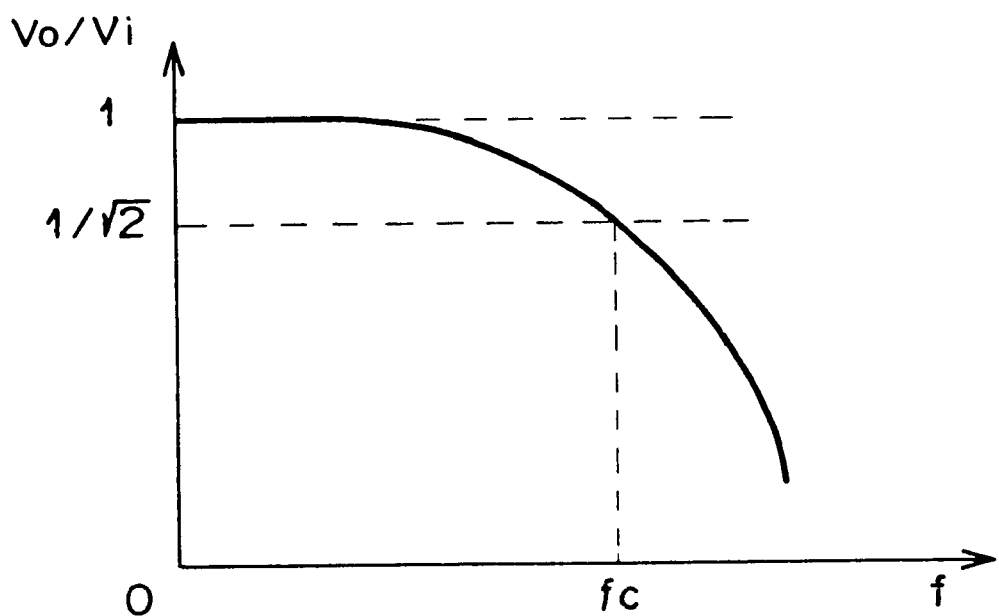

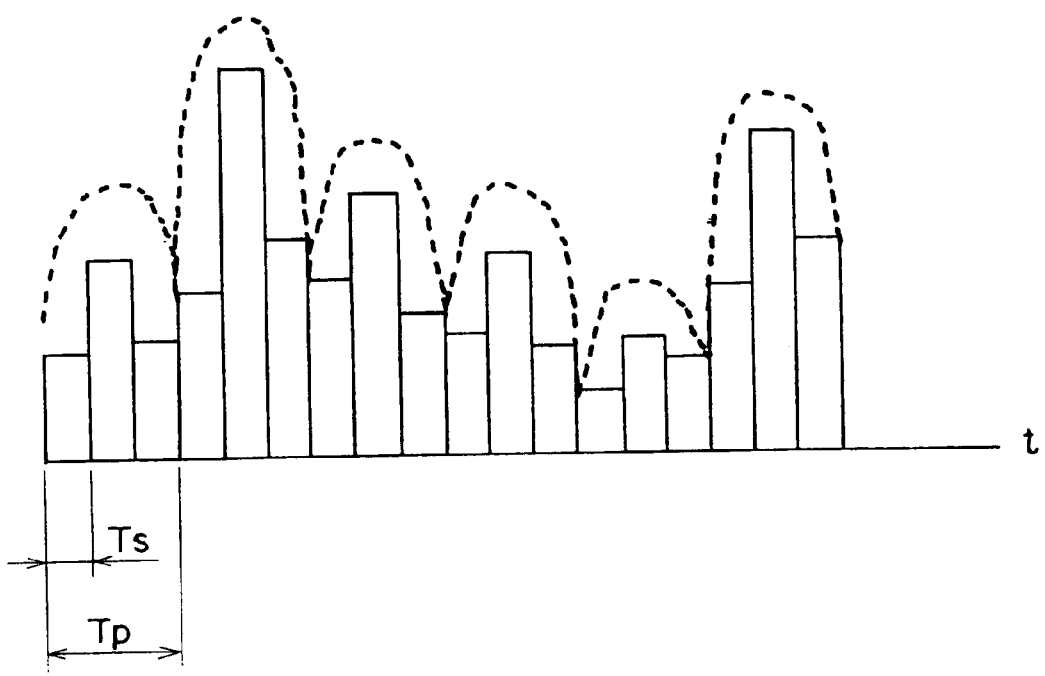
F I G. 5

METHOD OF AND APPARATUS FOR OBTAINING RADIATION IMAGE

BACKGROUND OF THE INVENTION

1. Field of the Invention

This invention relates to a method of and apparatus for obtaining a radiation image in which a radiation image recorded on a radiation image conversion panel is obtained as a digital image signal.

2. Description of the Related Art

When certain kinds of phosphors are exposed to a radiation such as X-rays, α-rays, β-rays, γ-rays, cathode rays or ultraviolet rays, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". As a system alternative to the conventional radiography using photographic film and a sensitized screen, a radiation image recording system using such a stimulable phosphor has been put into practice. In this system, a radiation image conversion panel (sometimes called "stimulable phosphor sheet") having thereon a stimulable phosphor layer is used. That is, when the radiation image conversion panel is exposed to a radiation passing through an object or emitted from an object, the stimulable phosphor layer absorbs a part of energy of the radiation and stores a radiation image of the object as a latent image. When the radiation image conversion panel is exposed to stimulating light such as visible light or infrared rays, the stimulable phosphor layer emits stimulated emission in proportion to the radiation energy stored thereon. The stimulated emission is photoelectrically converted into an electric image signal and a radiation image of the objected is reproduced as a visible image on the basis of the electric image signal. After the radiation image is read out the radiation image conversion panel is exposed to erasing light and is caused to release residual radiation energy so that the radiation image conversion panel can be used again.

It is preferred that the radiation image conversion panel be highly sensitive and can reproduce a high quality radiation image. Especially, in the diagnostic radiation image recording and reproducing system, which is a typical application of the radiation image recording system using the radiation image conversion panel, a high quality image is desired.

However, the stimulating light projected onto the stimulable phosphor layer of the radiation image conversion panel when the radiation image stored thereon is to be read diffuses in the stimulable phosphor layer and deteriorates resolution of the radiation image. That is, the latent radiation image stored on the stimulable phosphor layer of the radiation image conversion panel is read out by causing a beam of the stimulating light focused on the surface of the radiation image conversion panel to scan the radiation image conversion panel in both a main scanning direction and a sub-scanning direction and detecting the stimulated emission emitted in sequence from the parts of the radiation image conversion panel as the stimulating light beam scans the radiation image conversion panel. When the stimulating light two-dimensionally diffuses inside the phosphor layer, the stimulable phosphor outside the scanning spot is also stimulated to emit stimulated emission, which deteriorates the resolution of the radiation image.

In order to avoid such a phenomenon, it has been proposed to provide a partition wall impermeable to the stimulating light in the stimulable phosphor layer to linearly or two-dimensionally part the stimulable phosphor layer into a plurality of regularly arranged fine cells. In such an arrangement, stimulating light impinging upon one cell is prevented from diffusing to adjacent cells by the partition wall which is impermeable to the stimulating light, whereby a radiation image having a high resolution can be read out.

The partition wall impermeable to the stimulating light need not be perfectly impermeable to the stimulating light so long as it is less permeable to the stimulating light as compared with the stimulable phosphor in the cell.

However, the system provided with the partition wall impermeable to the stimulating light is disadvantageous in that each time the stimulating light beam passes the partition wall, the intensity of the stimulated emission becomes weak at regular intervals, and the analog image signal obtained by photoelectrically converting the stimulated emission into an electric signal comes to include periodic signals (e.g., signals which will generate moiré fringes) which represents that the stimulating light beam passes the partition wall. When the analog image signal is digitized into a digital image signal, aliasing noise can be generated to distort the image depending on the relation between the periodic signals generated when the stimulating light beam passes the partition wall and the sampling periods at which the analog image signal is sampled.

SUMMARY OF THE INVENTION

In view of the foregoing observations and description, the primary object of the present invention is to provide a method of and an apparatus for obtaining a digital radiation image which is free from aliasing noise which is generated when an analog image signal read out from a radiation image conversion panel provided with a partition wall is digitized and which can reproduce a high quality radiation image.

In accordance with a first aspect of the present invention, there is provided a method of obtaining a radiation image in which a radiation image conversion panel having a stimulable phosphor layer which is parted into a plurality of cells regularly arranged at least in a main scanning direction by a partition wall and has been exposed to a radiation bearing thereon a radiation image of an object is scanned by a stimulating light beam in the main scanning direction and a sub-scanning direction, stimulated emission emitted from the radiation image conversion panel upon stimulation by the stimulating light beam is photoelectrically detected to make up an analog image signal and a digital image signal representing a radiation image of the object is obtained by digitizing the analog image signal, wherein the improvement comprises that the sampling intervals Ts (in seconds) for digitizing the analog image signal are set to satisfy formula $$Ts \leq Na/2v,$$

wherein Na represents the pitch (m) of the cells in the main scanning direction and v represents the scanning speed (m/sec).

It is preferred that the sampling intervals Ts be set to satisfy formula $$Na/40v \leq Ts \leq Na/2v.$$

It is further preferred that the analog image signal be obtained through a low-pass filter whose cut-off frequency fc (Hz) satisfies formula $$fc \leq 0.5/Ts.$$

In accordance with a second aspect of the present invention, there is provided a method of obtaining a radiation image in which a radiation image conversion panel having a stimulable phosphor layer which is parted into a plurality of cells regularly arranged at least in a sub-scanning direction by a partition wall and has been exposed to a radiation bearing thereon a radiation image of an object is scanned by a stimulating light beam in a main scanning direction and the sub-scanning direction, stimulated emission emitted from the radiation image conversion panel upon stimulation by the stimulating light beam is photoelectrically detected to make up an analog image signal and a digital image signal representing a radiation image of the object is obtained by digitizing the analog image signal, wherein the improvement comprises that the scanning intervals L (m) in the sub-scanning direction are set to satisfy formula $$L \leq Nb/2,$$

wherein Nb represents the pitch (m) of the cells in the sub-scanning direction.

It is preferred that the scanning intervals L be set to satisfy formula $$Nb/40 \leq L \leq Nb/2.$$

When the radiation image conversion panel has a stimulable phosphor layer which is parted into a plurality of cells regularly arranged in both a main scanning direction and a sub-scanning direction by a partition wall, it is preferred that the sampling intervals Ts (in seconds) for digitizing the analog image signal be set to satisfy formula $$Ts \leq Na/2v,$$

and at the same time, the scanning intervals L (m) in the sub-scanning direction be set to satisfy formula $$L \leq Nb/2,$$

wherein Na represents the pitch of the cells in the main scanning direction, v represents the scanning speed (m/sec) and Nb represents the pitch (m) of the cells in the sub-scanning direction.

At this time, it is further preferred that the sampling intervals Ts be set to satisfy formula $$Na/40v \leq Ts \leq Na/2v$$

and the scanning intervals L be set to satisfy formula $$Nb/40 \leq L \leq Nb/2.$$

In accordance with a third aspect of the present invention, there is provided an apparatus for obtaining a radiation image comprising a radiation image conversion panel having a stimulable phosphor layer which is parted into a plurality of cells regularly arranged at least in a main scanning direction by a partition wall, a scanning means which causes a stimulating light beam to scan the radiation image conversion panel in the main scanning direction and a sub-scanning direction, a detecting means which photoelectrically detects stimulated emission emitted from the radiation image conversion panel upon stimulation by the stimulating light beam to make up an analog image signal and a digital image signal obtaining means which digitizes the analog image signal into a digital image signal representing a radiation image of the object, wherein the improvement comprises that the digital image signal obtaining means samples the analog image signal at sampling intervals Ts (in seconds) which are set to satisfy formula $$Ts \leq Na/2v,$$

wherein Na represents the pitch of the cells in the main scanning direction and v represents the scanning speed (m/sec)

It is preferred that the sampling intervals Ts be set to satisfy formula $$Na/40v \leq Ts \leq Na/2v.$$

It is further preferred that said detecting means obtains the analog image signal through a low-pass filter whose cut-off frequency fc (Hz) satisfies formula $$fc \leq 0.5/Ts.$$

It is further preferred that the pitch of the cells in the main scanning direction be in the range of not smaller than 20 $\mu$m and not larger than 300 $\mu$m.

In accordance with a fourth aspect of the present invention, there is provided an apparatus for obtaining a radiation image comprising a radiation image conversion panel having a stimulable phosphor layer which is parted into a plurality of cells regularly arranged at least in a sub-scanning direction by a partition wall, a scanning means which causes a stimulating light beam to scan the radiation image conversion panel in a main scanning direction and the sub-scanning direction, a detecting means which photoelectrically detects stimulated emission emitted from the radiation image conversion panel upon stimulation by the stimulating light beam to make up an analog image signal and a digital image signal obtaining means which digitizes the analog image signal into a digital image signal representing a radiation image of the object, wherein the improvement comprises that the scanning means causes the stimulating light beam to scan the radiation image conversion panel in the sub-scanning direction at scanning intervals L (m) which are set to satisfy formula $$L \leq Nb/2,$$

wherein Nb represents the pitch (m) of the cells in the sub-scanning direction.

It is preferred that the scanning intervals L be set to satisfy formula $$Nb/40 \leq L \leq Nb/2.$$

It is further preferred that the pitch of the cells in the sub-scanning direction be in the range of not smaller than 20 $\mu$m and not larger than 300 $\mu$m.

When the radiation image conversion panel has a stimulable phosphor layer which is parted into a plurality of cells regularly arranged in both a main scanning direction and a sub-scanning direction by a partition wall, it is preferred that the sampling intervals Ts (in seconds) for digitizing the analog image signal be set to satisfy formula $$Ts \leq Na/2v,$$

and at the same time,
the scanning intervals L (m) in the sub-scanning direction be set to satisfy formula $$L \leq Nb/2,$$

wherein Na represents the pitch (m) of the cells in the main scanning direction, v represents the scanning speed (m/sec) and
Nb represents the pitch (m) of the cells in the sub-scanning direction.

At this time, it is further preferred that the sampling intervals Ts be set to satisfy formula $$Na/40v \leq Ts \leq Na/2v$$

and the scanning intervals L be set to satisfy formula $$Nb/40 \leq L \leq Nb/2.$$

It is further preferred that the pitch of the cells be in the range of not smaller than 20 μm and not larger than 300 μm in both the main scanning direction and the sub-scanning direction.

In accordance with the first aspect of the present invention, since the sampling intervals Ts (in seconds) for digitizing the analog image signal are set to satisfy formula $$Ts \leq Na/2v,$$

sampling is effected two or more times in a pitch of the cells in the main scanning direction and accordingly, regular signal components of the analog image signal representing the partition wall are digitized under a condition which satisfies the so-called sampling theorem, whereby the regular signal components representing the partition wall are prevented from being included in the digital image signal as aliasing noise.

Further, when the sampling intervals Ts are set to satisfy formula $$Na/40v \leq Ts \leq Na/2v,$$

unnecessary signal components which are excessively high in frequency are not included in the digital image signal, and accordingly, the signal processing time can be shortened and load on the system can be lightened.

When the analog image signal is obtained through a low-pass filter whose cut-off frequency fc (Hz) satisfies formula $$fc \leq 0.5/Ts,$$

generation of aliasing noise other than those due to the regular signal components representing the partition wall is prevented.

When the pitch of the cells in the main scanning direction is in the range of not smaller than 20 μm and not larger than 300 μm, the cells can be easily formed while holding desired resolution.

In accordance with the second aspect of the present invention, since the scanning intervals L (m) in the sub-scanning direction are set to satisfy formula $$L \leq Nb/2,$$

sampling is effected two or more times in a pitch of the cells in the sub-scanning direction and accordingly, regular signal components of the analog image signal representing the partition wall are digitized under a condition which satisfies the so-called sampling theorem, whereby the regular signal components representing the partition wall are prevented from being included in the digital image signal as aliasing noise.

Further, when the scanning intervals L are set to satisfy formula $$Nb/40 \leq L \leq Nb/2,$$

unnecessary signal components which are excessively high in frequency are not included in the digital image signal, and accordingly, the signal processing time can be shortened and load on the system can be lightened.

When the radiation image conversion panel has a stimulable phosphor layer which is parted into a plurality of cells regularly arranged in both a main scanning direction and a sub-scanning direction by a partition wall, the sampling intervals Ts (in seconds) for digitizing the analog image signal are set to satisfy formula $$Ts \leq Na/2v,$$

and at the same time, the scanning intervals L (m) in the sub-scanning direction are set to satisfy formula $$L \leq Nb/2,$$

sampling is effected two or more times both in a pitch of the cells in the main scanning direction and in a pitch of the cells in the sub-scanning direction and accordingly, regular signal components of the analog image signal representing the partition wall are digitized under a condition which satisfies the so-called sampling theorem, whereby the regular signal components representing the partition wall are prevented from being included in the digital image signal as aliasing noise.

BRIEF DESCRIPTION OF THE DRAWINGS

FIG. 2 is a view showing the cut-off frequency of the low-pass filter, FIG. 5 is a view showing the digital image signal obtained by digitizing the analog image signal shown in FIG. 4.

DESCRIPTION OF THE PREFERRED EMBODIMENT

Figure 1:
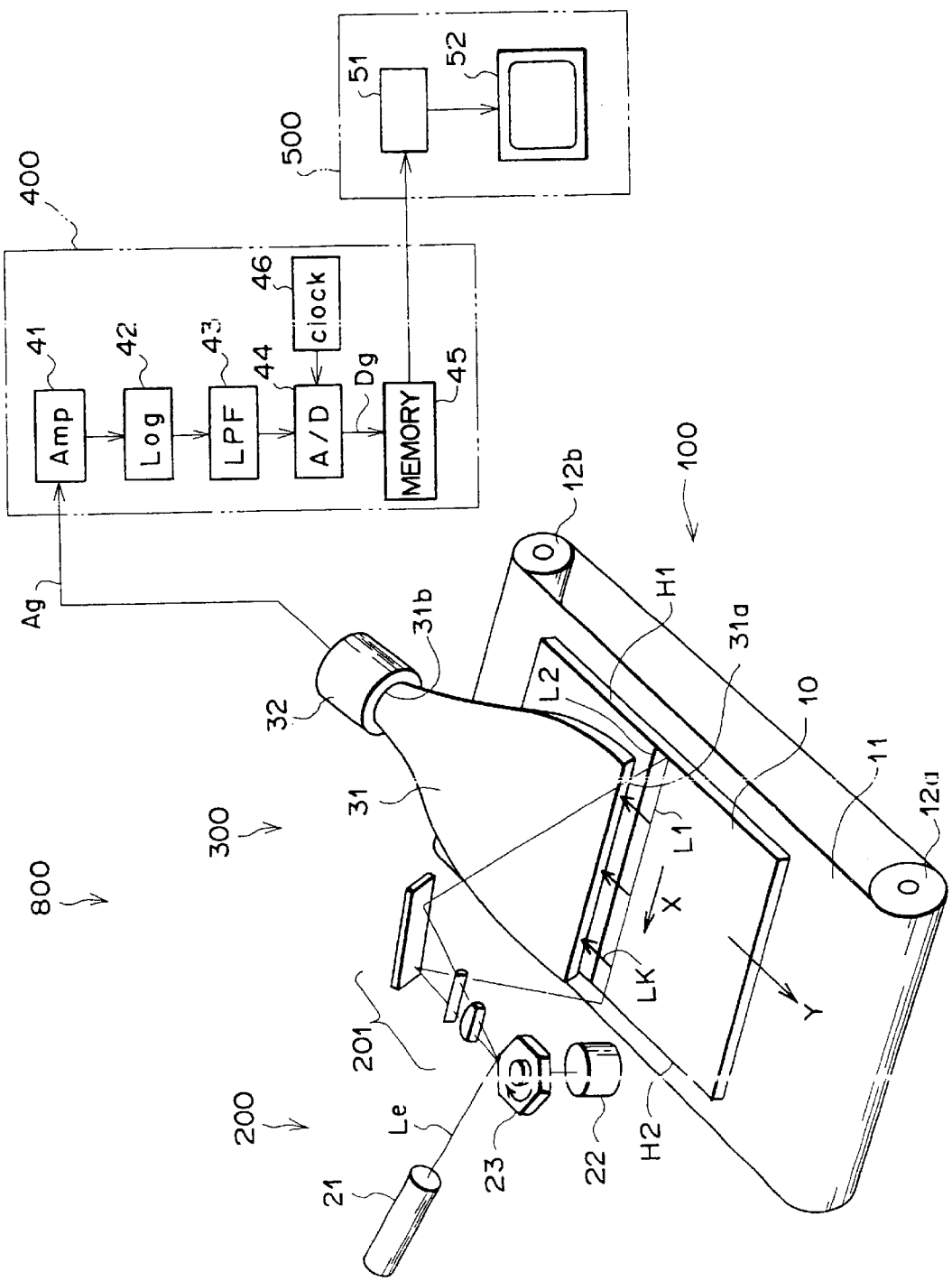
FIG. 1 is a schematic view showing an radiation image obtaining apparatus in accordance with an embodiment of the present invention.

In FIG. 1, a radiation image obtaining apparatus 800 in accordance with an embodiment of the present invention comprises a conveyor unit 100 which conveys a radiation image conversion panel 10 on which a radiation image has been recorded, a stimulating light projecting unit 200 which causes a stimulating light beam to scan the radiation image conversion panel 10 in a direction substantially perpendicular to the direction of conveyance of the radiation image conversion panel 10 by the conveyor unit 100, a detector unit 300 which photoelectrically detects stimulated emission emitted from the radiation image conversion panel 10 upon exposure to the stimulating light beam, and a digital image obtaining unit 400 which processes an analog image signal photoelectrically detected by the detector unit 300 and obtains a digital image signal representing the radiation image recorded on the radiation image conversion panel 10.

The conveyor unit 100 comprises an endless belt 11 on which the radiation image conversion panel 10 is placed, and a pair of rollers 12a and 12b which support the endless belt 11. The roller 12a is rotated by a drive means (not shown) to run the endless belt 11 (and to move the radiation image conversion panel 10 thereon) in the direction of arrow Y (the sub-scanning direction) by 60 $\mu$m per one main scanning (to be described later).

The stimulating light projecting unit 200 comprises a stimulating light source 21 which emits a stimulating light beam Le, a rotary polygonal mirror 23 which is rotated by a motor 22 and deflects the stimulating light beam Le, and an optical system 201 made up of an fθ lens, a cylindrical lens, a mirror and the like which are arranged to converge the deflected stimulating light beam Le on the radiation image conversion panel 10. The stimulating light beam Le emitted from the stimulating light source 21 is caused to repeatedly scan the radiation image conversion panel 10 at a speed of 40 m/sec in a direction substantially perpendicular to the sub-scanning direction (the direction of arrow X) by the polygonal mirror 23 and the optical system 201.

The detector unit 300 comprises a light guide 31 which takes in the stimulated emission Lk (emitted from the radiation image conversion panel 10 upon exposure to the stimulating light beam Le) from its inlet end 31a and radiates the stimulated emission Lk through its outlet end 31b, and photomultiplier 32 which photoelectrically detects the stimulated emission Lk radiated through the outlet end 31b. The light guide 31 is formed by a light transmitting material such as an acrylic plate. The inlet end 31a of the guide 31 is in the form of a linear opening and the outlet end 31b of the light guide 31 is in the form of a circular opening. The linear inlet end 31a of the light guide 31 extends in the main scanning direction and the circular light outlet end 31b of the light guide 31 is connected to the light receiving face of the photomultiplier 32. The stimulated emission Lk which enters the light guide 31 from the inlet end face 31a travels to the outlet end face 31b while repeating total reflection and then impinges upon the photomultiplier 32. The photomultiplier 32 converts the stimulated emission Lk to an analog electric image signal.

The digital image obtaining unit 400 comprises a pre-amplifier 41 which amplifies the analog image signal output from the detector unit 300, a log-amplifier 42 which logarithmically converts the analog image signal amplified by the pre-amplifier 41, and a low-pass filter 43 whose cut-off frequency fc is 0.5 MHz. The analog image signal output through the low-pass filter 43 is digitized into a digital image signal by an A/D converter 44 whose sampling intervals Ts are set to 1 $\mu$sec, and the digital image signal is stored in an image memory 45 as two-dimensional image data.

The low-pass filter 43 transmits signals at lower frequencies and attenuates those at higher frequencies on the basis of the cut-off frequency fc. In this particular embodiment, the low-pass filter 43 attenuates the ratio vo/vi of the amplitude vi of the input signal to the amplitude vo of the out signal to $1/\sqrt{2}$ at the cut-off frequency fc as shown in FIG. 2.

A display unit 500 comprises an image signal processing circuit 51 which receives the two-dimensional image data from the image memory 45, converts it into an image signal and outputs the image signal, and a display 52 which displays an image on the basis of the image signal output from the image signal processing circuit 51.

Figure 3A:
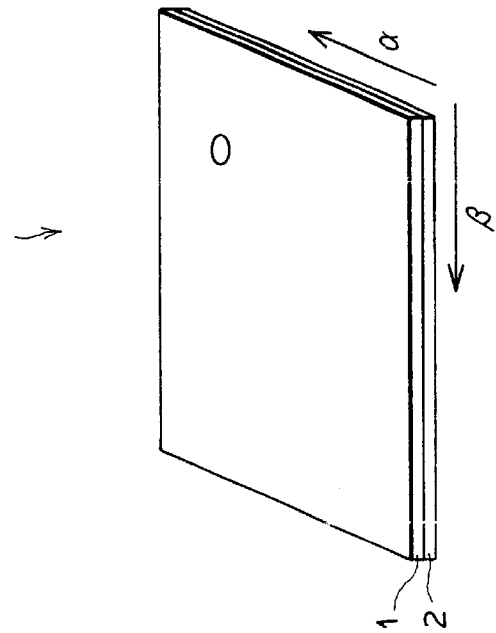
FIG. 3A is a perspective view of the radiation image conversion panel.
Figure 3B:
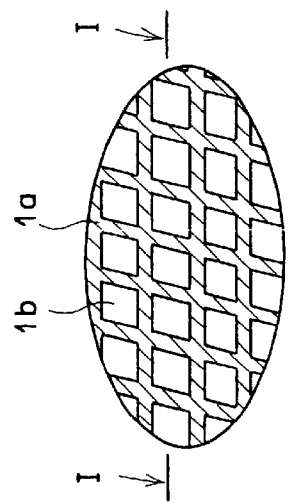
FIG. 3B is an enlarged view of a part of the surface of the radiation image conversion panel.
Figure 3C:
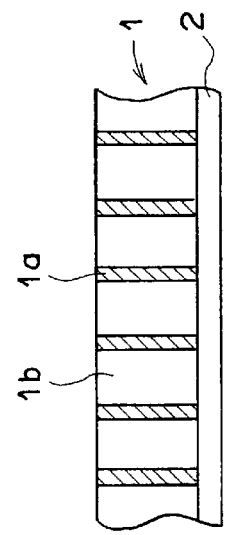
FIG. 3C is a cross-sectional view taken along line I—I in FIG. 3B.
Figure 4:
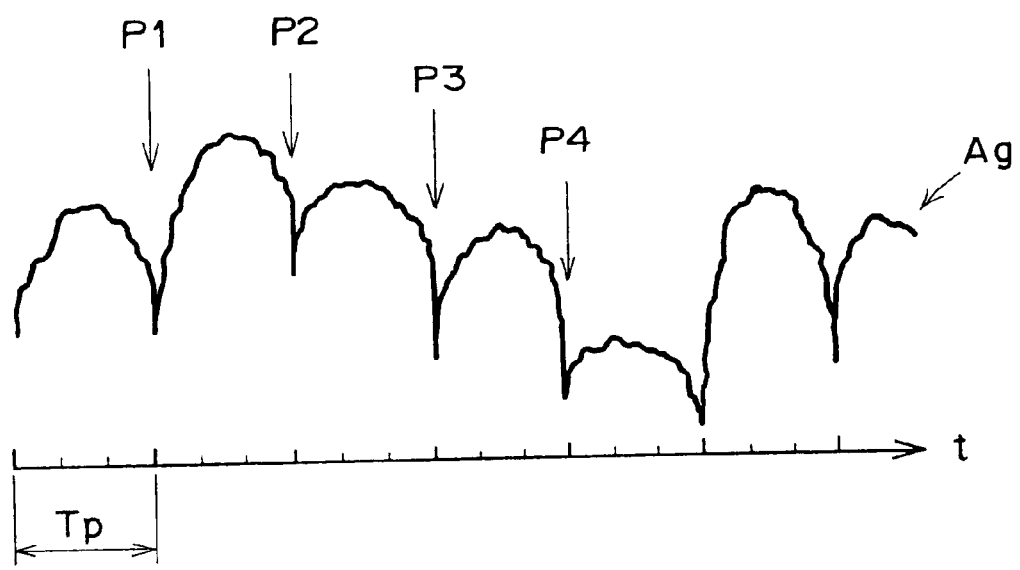
FIG. 4 is a view showing the waveform of an analog image signal.

FIG. 3A is a perspective view of the radiation image conversion panel 10, FIG. 3B is an enlarged view of a part of the radiation image conversion panel 10, and FIG. 3C is a cross-sectional view taken along line I—I in FIG. 3B. As shown in FIG. 3A, the radiation image conversion panel 10 is rectangular in shape and is provided with a stimulable phosphor layer 1 formed on a support sheet 2. The stimulable phosphor layer 1 is parted into a plurality of cells regularly arranged in the directions of arrows α and β by a partition wall 1a as shown in FIGS. 3B and 3C. Reference numeral 1B denotes the stimulable phosphor in each cell parted by the partition wall 1a. The partition wall 1a is of a material impermeable to the stimulating light. The stimulable phosphor 1b in each cell emits stimulated emission Lk upon exposure to the stimulating light beam Le. Since the partition wall 1a is of a material impermeable to the stimulating light, the stimulating light beam Le which enters a cell does not enter an adjacent cell through the partition wall 1a to stimulate the stimulable phosphor 1b in the adjacent cell.

The cell pitches are 120 $\mu$m in both the directions of arrows α and β, and the radiation image conversion panel 10 is placed on the endless belt 11 of the conveyor unit 100 so that the direction of arrow β becomes parallel to the direction of conveyance of the radiation image conversion panel 10 by the conveyor unit 100 (the sub-scanning direction or the direction of arrow Y in FIG. 1) and the direction of arrow α becomes parallel to the main scanning direction (the direction of arrow X in FIG. 1). While the stimulating light beam Le repeatedly scan the radiation image conversion panel 10 in the main scanning direction the conveyor unit 100 conveys the radiation image conversion panel 10 in the sub-scanning direction, whereby the radiation image conversion panel 10 is two-dimensionally scanned by the stimulating light beam Le.

Operation of the radiation image obtaining apparatus 800 of this embodiment will be described, hereinbelow. When the radiation image conversion panel 10 is two-dimensionally scanned by the stimulating light beam Le in the manner described above, parts of the stimulable phosphor layer 1 along the main scanning lines emit stimulated emission Lk in sequence. The stimulated emission Lk is detected by the detector unit 300 and converted to an analog image signal Ag. The analog image signal Ag is transmitted to the A/D converter 44 through the pre-amplifier 41, the log-amplifier 42 and the low-pass filter 43. Then the A/D converter 44 digitizes the analog image signal Ag into a digital image signal. Since the radiation image conversion panel 10 is conveyed by 60 $\mu$m in the sub-scanning direction while the stimulating light beam Le scans the radiation image conversion panel 10 along a main scanning line L1 from one edge H1 to the opposite edge H2, the next main scanning line L2 is at a distance of 60 $\mu$m from the preceding main scanning line L1 as shown in FIG. 1. By repeating the main scanning while the radiation image conversion panel 10 is conveyed in the sub-scanning direction, an analog image signal Ag representing a two-dimensional latent image recorded on the radiation image conversion panel 10 is obtained.

Digitization of the analog image signal Ag into a digital image signal Dg will be described in detail, hereinbelow. Digitization of the analog image signal obtained by the main scanning will be described first.

An analog image signal Ag output from the detector unit 300 during the main scanning represents intensity of the stimulated emission Lk emitted from the stimulable phosphor 1b in the cells when the stimulating light beam Le scans the surface of the radiation image conversion panel 10 where the partition wall 1a appears at regular intervals, and accordingly the analog image signal Ag includes signal components P1, P2, P3, P4 . . . representing the partition wall 1a at regular intervals Tp. The intervals Tp at which the signal components P1, P2, P3, P4 . . . representing the partition wall 1a (will be referred to as "partition wall signal components", hereinbelow) appear are obtained according to the following formula when the main scanning speed v of the stimulating light beam Le is 40 (m/sec) and the cell pitch in the main scanning direction Na is 120 ($\mu$m).

$$Tp=120\ (\mu m)/40\ (m/sec)=3\ (\mu sec)$$

Though the waveform of the analog image signal Ag output from the detector unit 300 is changed by the pre-amplifier 41, the log-amplifier 42, the low-pass filter 43 and the like, the partition wall signal components are left in the analog image signal Ag and regularly appear at intervals Tp of 3 $\mu$sec. When the analog image signal including therein the partition wall signal components which regularly appear at intervals Tp of 3 $\mu$sec is sampled at intervals Tp of 1 $\mu$sec, the periodic components of the partition wall signal components are reserved by the sampling theorem as shown in FIG. 5. This means that the partition wall signal components do not generate aliasing noise and at the same time, that signal components which have the same periods as the partition wall components and represent the radiation image stored on the stimulable phosphor 1b in the cells are also reserved.

The condition for preventing the periodic signal components due to the partition wall parting the cells at pitches Na in the main scanning direction is that the sampling intervals Ts satisfies the following formula (1).

$$Ts \leq Na/2v \qquad (1)$$

Further, as the sampling intervals Ts become shorter, a digital image signal of a higher resolution can be obtained. However, when the sampling intervals Ts are too short, the amount of data to be processed becomes too large and unnecessary signal components which are excessively high in frequency must be processed, which increases the amount of operation to be performed and the necessary storage capacity, thereby increasing load on the apparatus. In order to overcome this problem, it is preferred that the sampling intervals Ts satisfies the following formula (2).

$$Na/40v \leq Ts \leq Na/2V \qquad (2)$$

Further since signal components whose periods are not longer than 2 $\mu$sec are cut off the analog image signal Ag by the low-pass filter 43 whose cut-off frequency is set to 0.5 MHz, generation of aliasing noise due to A/D conversion of high frequency components is prevented. According to the sampling theorem, signal components whose periods are not shorter than the sampling intervals Ts can be digitized without generating aliasing noise. Accordingly, when the cut-off frequency fc of the low-pass filter 43 is not higher than 1/(2×Ts)=0.5/Ts, generation of aliasing noise can be prevented.

On the basis of the digital image signal Dg obtained in this manner, a radiation image can be reproduced without destroying information on the radiation image born by the stimulable phosphor 1b in each of the cells arranged in the main scanning direction.

Figure 6:
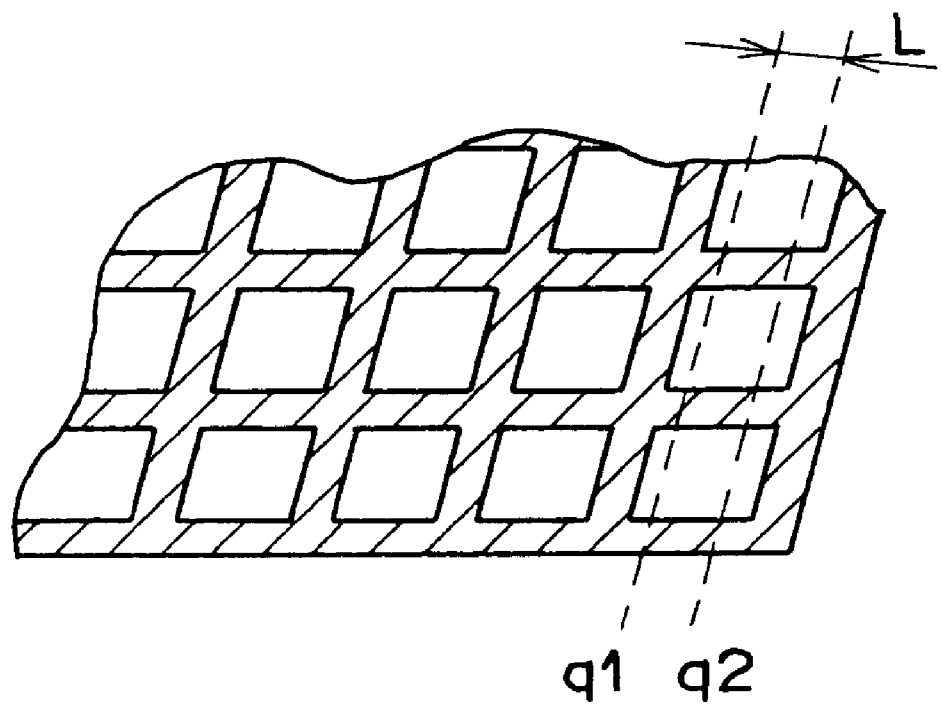
FIG. 6 is a view for illustrating the sampling intervals in the sub-scanning direction.

Digitization of the analog image signal obtained by the sub-scanning will be described next. Since the radiation image conversion panel 10 is conveyed by 60 $\mu$m in the sub-scanning direction during one main scanning, the analog image signal Ag is sampled at two points q1 and q2 within the cell pitch 120 $\mu$m in the sub-scanning direction as shown in FIG. 6. By effecting scanning at intervals not larger than ½ of the cell pitch in the sub-scanning direction from the viewpoint of space frequency, That is, by setting the scanning intervals L to satisfy the following formula (4) which is determined according to the sampling theorem, it is possible to prevent the partition wall signal components detected in the sub-scanning direction from making aliasing noise as the case of the partition wall signal components detected in the main scanning direction.

$$L \leq Nb/2 \qquad (4).$$

Further, as the sampling intervals (scanning intervals) L in the sub-scanning direction become shorter, a digital image signal of a higher resolution can be obtained. However, when the sampling intervals L are too short, the amount of data to be processed becomes too large and unnecessary signal components which are excessively high in frequency must be processed, which increases the amount of operation to be performed and the necessary storage capacity, thereby increasing load on the apparatus. In order to overcome this problem, it is preferred that the sampling intervals L satisfies the following formula (5).

$$Nb/40 \leq L \leq Nb/2 \qquad (5)$$

On the basis of the digital image signal Dg obtained in this manner, a radiation image can be reproduced without destroying information on the radiation image born by the stimulable phosphor 1b in each of the cells arranged in the sub-scanning direction.

The digital image signal Dg thus obtained is once stored in the image memory 45, and then input into the image signal processing circuit 51. The image signal processing circuit 51 carries out on the digital image signal Dg, for instance, digital filter processing for attenuating the partition wall signal components, and inputs into the display 52 a digital image signal substantially solely representing a radiation image.

It is preferred that the cell pitches in the main and sub-scanning direction be in the range of 20 $\mu$m to 300 $\mu$m in order to ensure desirable resolution and to facilitate formation of the cells.

Further, the cell pitches in the main scanning direction and those in the sub-scanning direction need not be equal to each other but may be different from each other.

Further, the cells need not be arranged in both the main scanning direction and the sub-scanning direction like a grid, but the cells may be arranged only in one of the main scanning direction and the sub-scanning direction like stripes.

What is claimed is:

1. A method of obtaining a radiation image in which a radiation image conversion panel having a stimulable phosphor layer which is parted into a plurality of cells regularly arranged at least in a main scanning direction by a partition wall and has been exposed to a radiation bearing thereon a radiation image of an object is scanned by a stimulating light beam in the main scanning direction and a sub-scanning direction, stimulated emission emitted from the radiation image conversion panel upon stimulation by the stimulating light beam is photoelectrically detected to make up an analog image signal and a digital image signal representing a radiation image of the object is obtained by digitizing the analog image signal, wherein the improvement comprises that the sampling intervals Ts (in seconds) for digitizing the analog image signal are set to satisfy formula $$Ts \leq Na/2v,$$

wherein Na represents the pitch (m) of the cells in the main scanning direction and v represents the scanning speed (m/sec).

2. A method as defined in claim 1 in which the sampling intervals Ts are set to satisfy formula $$Na/40v \leq Ts \leq Na/2v.$$

3. A method as defined in claim 1 in which the analog image signal is obtained through a low-pass filter whose cut-off frequency fc (Hz) satisfies formula $$fc \leq 0.5/Ts.$$

4. A method as defined in claim 1, wherein the analog image signal is filtered by a low pass filter such that a ratio of a low pass filter output signal to a low pass filter input signal is attenuated to $1/(2)^{1/2}$ at a cutoff frequency of the low pass filter.

5. A method of obtaining a radiation image in which a radiation image conversion panel having a stimulable phosphor layer which is parted into a plurality of cells regularly arranged at least in a sub-scanning direction by a partition wall and has been exposed to a radiation bearing thereon a radiation image of an object is scanned by a stimulating light beam in a main scanning direction and the sub-scanning direction, stimulated emission emitted from the radiation image conversion panel upon stimulation by the stimulating light beam is photoelectrically detected to make up an analog image signal and a digital image signal representing a radiation image of the object is obtained by digitizing the analog image signal, wherein the improvement comprises that the scanning intervals L (m) in the sub-scanning direction are set to satisfy formula $$L \leq Nb/2,$$

wherein Nb represents the pitch (m) of the cells in the sub-scanning direction.

6. A method as defined in claim 5 in which the scanning intervals L are set to satisfy formula $$Nb/40 \leq L \leq Nb/2.$$

7. A method of obtaining a radiation image in which a radiation image conversion panel having a stimulable phosphor layer which is parted into a plurality of cells regularly arranged in both a main scanning direction and a sub-scanning direction by a partition wall and has been exposed to a radiation bearing thereon a radiation image of an object is scanned by a stimulating light beam in the main scanning direction and the sub-scanning direction, stimulated emission emitted from the radiation image conversion panel upon stimulation by the stimulating light beam is photoelectrically detected to make up an analog image signal and a digital image signal representing a radiation image of the object is obtained by digitizing the analog image signal, wherein the improvement comprises that the sampling intervals Ts (in seconds) for digitizing the analog image signal are set to satisfy formula $$Ts \leq Na/2v,$$

and at the same time, the scanning intervals L (m) in the sub-scanning direction are set to satisfy formula $$L \leq Nb/2,$$

wherein Na represents the pitch (m) of the cells in the main scanning direction, v represents the scanning speed (m/sec) and Nb represents the pitch (m) of the cells in the sub-scanning direction.

8. A method as defined in claim 7 in which the sampling intervals Ts are set to satisfy formula $$Na/40v \leq Ts \leq Na/2v$$

and the scanning intervals L are set to satisfy formula $$Nb/40 \leq L \leq Nb/2.$$

9. An apparatus for obtaining a radiation image comprising a radiation image conversion panel having a stimulable phosphor layer which is parted into a plurality of cells regularly arranged at least in a main scanning direction by a partition wall, a scanning means which causes a stimulating light beam to scan the radiation image conversion panel in the main scanning direction and a sub-scanning direction, a detecting means which photoelectrically detects stimulated emission emitted from the radiation image conversion panel upon stimulation by the stimulating light beam to make up an analog image signal and a digital image signal obtaining means which digitizes the analog image signal into a digital image signal representing a radiation image of the object, wherein the improvement comprises that the digital image signal obtaining means samples the analog image signal at sampling intervals Ts (in seconds) which are set to satisfy formula $$Ts \leq Na/2v,$$

wherein Na represents the pitch (m) of the cells in the main scanning direction and v represents the scanning speed (m/sec).

10. An apparatus as defined in claim 9 in which the sampling intervals Ts be set to satisfy formula $$Na/40v \leq Ts \leq Na/2v.$$

11. An apparatus as defined in claim 9 in which said detecting means obtains the analog image signal through a low-pass filter whose cut-off frequency fc (Hz) satisfies formula $$fc \leq 0.5/Ts.$$

12. An apparatus as defined in claim 9 in which the pitch of the cells in the main scanning direction are in the range of not smaller than 20 µm and not larger than 300 µm.

13. An apparatus as defined in claim 9, wherein the digital signal obtaining means comprises a low pass filter which attenuates a ratio of a low pass filter output signal to a low pass filter input signal to $1/(2)^{1/2}$ at a cutoff frequency of the low pass filter.

14. An apparatus for obtaining a radiation image comprising a radiation image conversion panel having a stimulable phosphor layer which is parted into a plurality of cells regularly arranged at least in a sub-scanning direction by a partition wall, a scanning means which causes a stimulating light beam to scan the radiation image conversion panel in a main scanning direction and the sub-scanning direction, a detecting means which photoelectrically detects stimulated emission emitted from the radiation image conversion panel upon stimulation by the stimulating light beam to make up an analog image signal and a digital image signal obtaining means which digitizes the analog image signal into a digital image signal representing a radiation image of the object, wherein the improvement comprises that the scanning means causes the stimulating light beam to scan the radiation image conversion panel in the sub-scanning direction at scanning intervals L (m) which are set to satisfy formula $$L \leq Nb/2,$$

wherein Nb represents the pitch (m) of the cells in the sub-scanning direction.

15. An apparatus as defined in claim 14 in which the scanning intervals L are set to satisfy formula $$Nb/40 \leq L \leq Nb/2.$$

16. An apparatus as defined in claim 14 in which the pitch of the cells in the sub-scanning direction is in the range of not smaller than 20 μm and not larger than 300 μm.

17. An apparatus for obtaining a radiation image comprising a radiation image conversion panel having a stimulable phosphor layer which is parted into a plurality of cells regularly arranged in both a main scanning direction and a sub-scanning direction by a partition wall, a scanning means which causes a stimulating light beam to scan the radiation image conversion panel in the main scanning direction and the sub-scanning direction, a detecting means which photoelectrically detects stimulated emission emitted from the radiation image conversion panel upon stimulation by the stimulating light beam to make up an analog image signal and a digital image signal obtaining means which digitizes the analog image signal into a digital image signal representing a radiation image of the object, wherein the improvement comprises that the sampling intervals Ts (in seconds) for digitizing the analog image signal are set to satisfy formula $$Ts \leq Na/2v,$$

and at the same time, the scanning intervals L (m) in the sub-scanning direction are set to satisfy formula $$L \leq Nb/2,$$

wherein Na represents the pitch (m) of the cells in the main scanning direction, v represents the scanning speed (m/sec) and Nb represents the pitch (m) of the cells in the sub-scanning direction.

18. An apparatus as defined in claim 17 in which the sampling intervals Ts are set to satisfy formula $$Na/40v \leq Ts \leq Na/2v$$

and the scanning intervals L are set to satisfy formula $$Nb/40 \leq L \leq Nb/2.$$

19. An apparatus as defined in claim 17 in which the pitch of the cells be in the range of not smaller than 20 μm and not larger than 300 μm in both the main scanning direction and the sub-scanning direction.

* * * * *